United States Patent [19]
Saito

[11] Patent Number: 6,146,047
[45] Date of Patent: Nov. 14, 2000

[54] FASTENER AND FASTENING STRUCTURE

[76] Inventor: Tetsuro Saito, 2-11-17 Misono, Sagamihara-city, Kanagawa-pref., Japan

[21] Appl. No.: 09/012,401

[22] Filed: Jan. 23, 1998

[30] Foreign Application Priority Data

Jan. 24, 1997 [JP] Japan ............................. 9-024513

[51] Int. Cl.[7] .......................................... A47F 3/00
[52] U.S. Cl. ........................ 403/292; 403/403; 403/297; 411/417; 411/84
[58] Field of Search ..................... 403/205, 403, 403/231, 401, 402, 230, 374.4, 409.1, 297, 292, 320; 411/417, 84, 85, 553, 552, 551, 550

[56] References Cited

U.S. PATENT DOCUMENTS

| | | | |
|---|---|---|---|
| 1,049,830 | 1/1913 | Elyovszky | 403/402 X |
| 2,507,882 | 5/1950 | Berman | 411/417 |
| 3,767,237 | 10/1973 | Suchowski | 403/402 X |
| 3,932,046 | 1/1976 | Kawazu | 403/402 X |
| 4,712,942 | 12/1987 | Brown | 403/231 X |
| 4,836,730 | 6/1989 | Jesson et al. | 411/417 X |
| 4,840,440 | 6/1989 | Dieter | 403/402 X |
| 4,840,525 | 6/1989 | Rebentisch | 411/85 |
| 5,011,323 | 4/1991 | Liuo | 403/402 X |
| 5,199,836 | 4/1993 | Gorgarty | 411/84 |

FOREIGN PATENT DOCUMENTS

2917680  11/1980  Germany .............................. 403/401

*Primary Examiner*—Lynne H. Browne
*Assistant Examiner*—John R. Cottingham
*Attorney, Agent, or Firm*—Fish & Richardson P.C.

[57] ABSTRACT

Provided are a fasterner enabling a plurality of members to be joined strongly and simply in a manner permitting ready disassembly and a fastening structure enabling a plurality of members to be so joined by optional use of the fastener. In one aspect of the invention, the fastener includes an operating piece formed on opposite sides of a base portion thereof with catches and a pair of elastic members extending integrally from the operating piece, curving toward the opposite sides of the base portion and being formed at their tips with claws engageable with the catches of the operating pieces, outer surfaces of the elastic members constituting locking surfaces that taper toward the base of the operating piece when the claws of the elastic members engage with the catches of the operating piece. In another aspect of the invention, the fastener includes a cylindrical body and spiral projections formed integrally with the peripheral surface of the cylindrical body. The members to be joined are formed with mortises, a multilegged connector is inserted into the mortises, and the legs of the connector are immobilized in the mortises by use of invention fasteners or conventional fasteners.

2 Claims, 7 Drawing Sheets

FASTENER AND FASTENING STRUCTURE

BACKGROUND OF THE INVENTION

1. Field of the Invention

This invention relates to a fastener for joining a plurality of members (particularly panels and boards) of furniture, interior finishing work, partitions, scaffolding, guardrails, wooden structures etc., particularly a fastener that engages by deformation upon forced insertion or a fastener that provides strong immobilization of a connector when inserted into a mortise of rectangular section and rotated into forced contact with the inner surfaces of the mortise, to a connector for connecting members formed with dovetail mortises or mortises of rectangular section, to the resulting fastening structure, and to a fastening structure for joining a plurality of members using screws or other such fasteners.

2. Prior Art Statement

Conventionally, the various wooden members and various metal and plastic panel-like members of furniture, interior finishing work, partitions, scaffolding, guardrails, wooden structures etc. and have been joined by use of nails, screws, rivets etc. In addition, the various fasteners used in the assembly of structures, furniture etc. and the joining of the members of scaffolding, guardrails and other architectural and civil engineering structures have been developed solely for the purpose of joining the members.

These conventional fasteners have various drawbacks, such as that they do not allow disassembly and reassembly or, even if they do, are very troublesome to reuse, and that the connection between pieces tends to be loose when the same holes or threaded holes are reused. Moreover, the conventional fasteners are not designed to provide high strength in small numbers but are designed solely for the purpose of fastening with no thought to the strength of the joint.

When a plurality of members (particularly panels and boards) of furniture, interior finishing work, partitions, scaffolding, guardrails, wooden structures etc. are successively joined using conventional fasteners, the fasteners protrude from the surfaces of the members (panels or boards). This makes it difficult to treat end surface protrusions in the joined state. Since the structure has the fasteners attached to the outer surface of the members, moreover, even simple structures have to be finished with the fasteners protruding from the members. Owing to the relationship with the wall surface, therefore, the structure is degraded aesthetically by gaps present at the joined surfaces. Furthermore, in the case of buildings, room interior finish work, scaffolding, guardrails etc., the need for strength has made it necessary to install braces solely for reinforcement, sacrificing good esthetics. In addition, reinforcement of a right-angle joint between two panels or boards has required provision of angles at the corners. Such angles may also spoil the appearance of the structure. They are also liable to provide insufficient strength because the bending moment acts on only the members.

SUMMARY OF THE INVENTION

This invention was accomplished to overcome these technical shortcomings of the prior art by providing a fastener offering strong joining force and enabling assembly and disassembly by a simple one-touch pressure deformation operation or enabling immobilization of panel members when rotated into forced contact with the inner walls of mortises, and a fastening structure utilizing the fastener to fasten a plurality of members formed with dovetail mortises or mortises of rectangular section. The invention also provides a fastening structure for joining by use of screws and other such fasteners.

For achieving these objects, a first aspect of the invention provides a fastener comprising an operating piece formed on opposite sides of its base portion with catches and a pair of elastic members extending integrally from the operating piece, curving toward the opposite sides of the base portion and being formed at their tips with claws engageable with the catches of the operating pieces, outer surfaces of the elastic members constituting locking surfaces that taper toward the base of the operating piece when the claws of the elastic members engage with the catches of the operating piece. The catches can be step-like portions formed in the operating piece and the claws can be hook-like projections formed at the tips of the elastic members.

A second aspect of the invention provides a fastening structure for joining a plurality of members comprising dovetail mortises formed in front and rear surfaces of a first member and front and rear surfaces of a second member, and a connector composed of pairs of legs joined at right angles, the legs having sectional shapes like those of the dovetail mortises and being formed with notches for insertion of fasteners according to the first aspect of the invention, joining of the first and second members being effected by inserting the legs into the dovetail mortises, inserting a fastener into each notch and pressing the operating pieces of the fasteners inward to engage the claws of the elastic members with the catches of the operating pieces and force the locking surfaces into pressure contact with side walls of the dovetail mortise.

Another aspect of the invention provides a fastening structure for joining a plurality of members comprising dovetail mortises formed in front and rear surfaces of a first member and front and rear surfaces of a second member, and a connector composed of pairs of legs joined at right angles, the legs having sectional shapes like those of the dovetail mortises, joining of the first and second members being effected by inserting the legs into the dovetail mortises and fastening the legs to side walls of the mortises by screws or other such fasteners.

Another aspect of the invention provides a fastening structure for joining a plurality of members comprising mortises of rectangular section formed in front and rear surfaces of a first member and front and rear surfaces of a second member, a connector composed of pairs of legs joined at right angles, the legs having rectangular sectional shapes like those of the mortises and being formed with notches, and fasteners for insertion into the notches, joining of the first and second members being effected by inserting the legs into the mortises, inserting a fastener into each notch and forcing the fasteners into strong pressure contact with side walls of the notches. This configuration enables the fastening of the connector to the side walls of the mortises to be achieved by use of a one-touch fastener or of screws or other such fasteners.

Another aspect of the invention provides a fastener comprising a cylindrical body and spiral projections formed integrally with the peripheral surface of the cylindrical body, joining of a plurality of members being effected by forming mortises in front and rear surfaces of a first member and front and rear surfaces of a second member, inserting into the mortises legs of a connector composed of pairs of legs having sectional shapes like those of the mortises and being formed with notches of a width substantially equal to a width of the cylindrical body, and inserting one of the fasteners into each notch.

The fastener can be provided at a portion destined to face outward after insertion into the notch with a hole shaped to accommodate a tip of a slot, Phillips or box screwdriver, whereby the fastener inserted into the mortise can be rotated by a screwdriver to force it into the mortise with the spiral projections making strong forced contact with side walls of the mortise

DESCRIPTION OF THE PREFERRED EMBODIMENTS

Figure 1A:
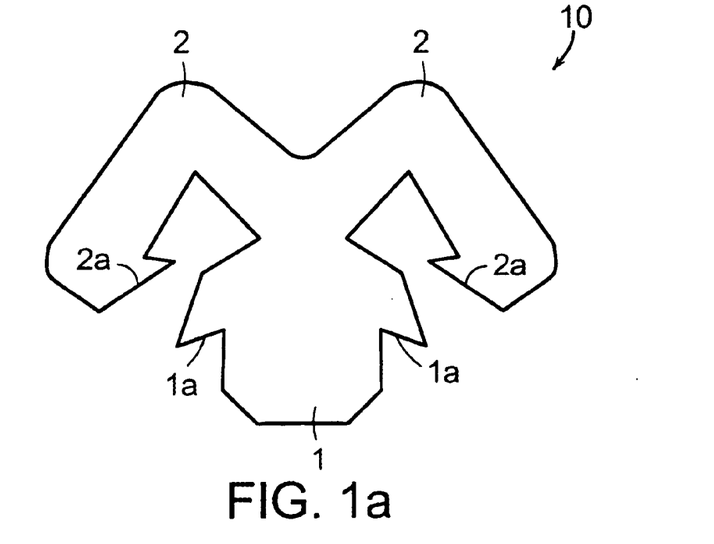
FIGS. 1(a) and (b) are a front view and a plan view of a fastener according invention.
Figure 1B:
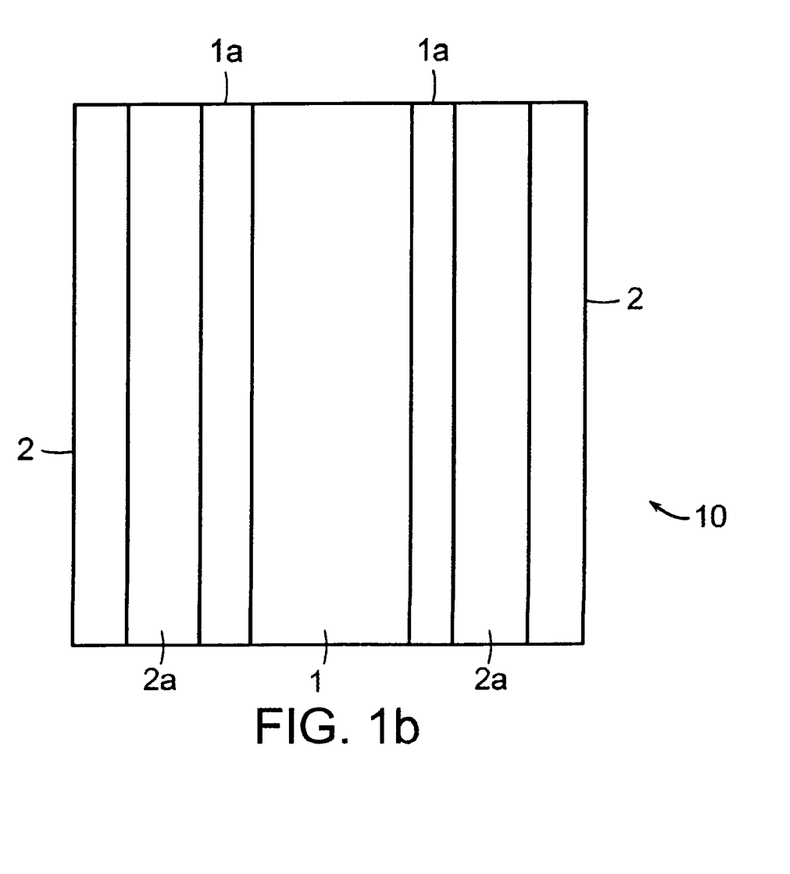
Figure 2A:
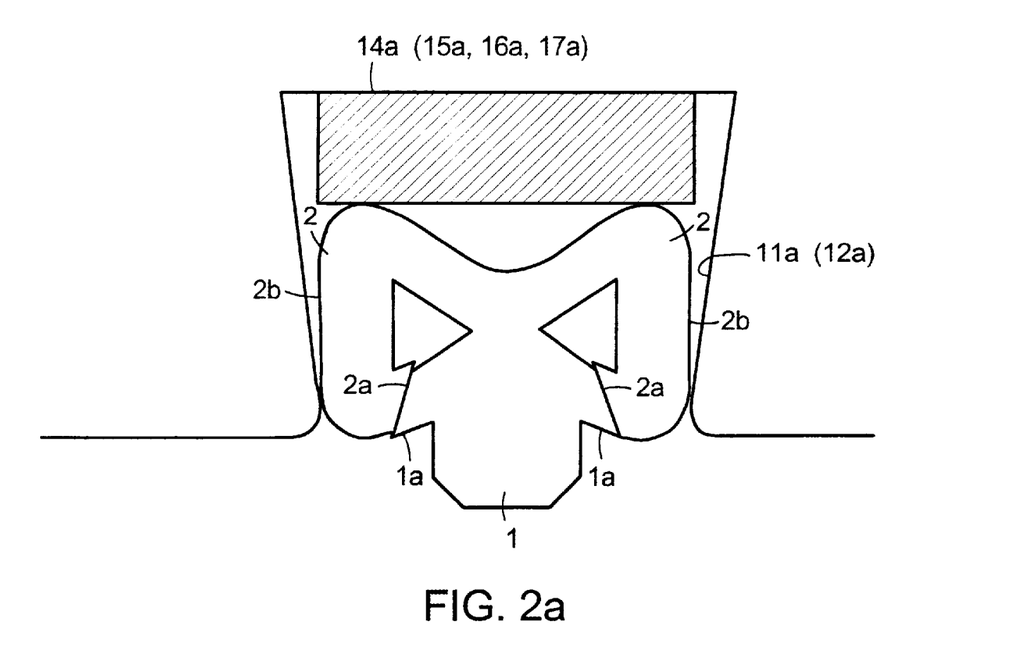
FIGS. 2(a) and 2(b) are diagrams illustrating how the fastener of FIG. 1 is used, FIG. 2(a) showing the fastener inserted into a dovetail mortise and FIG. 2(b) showing an operating piece of the fastener pressed inward to bring claws into engagement with catches.
Figure 2B:
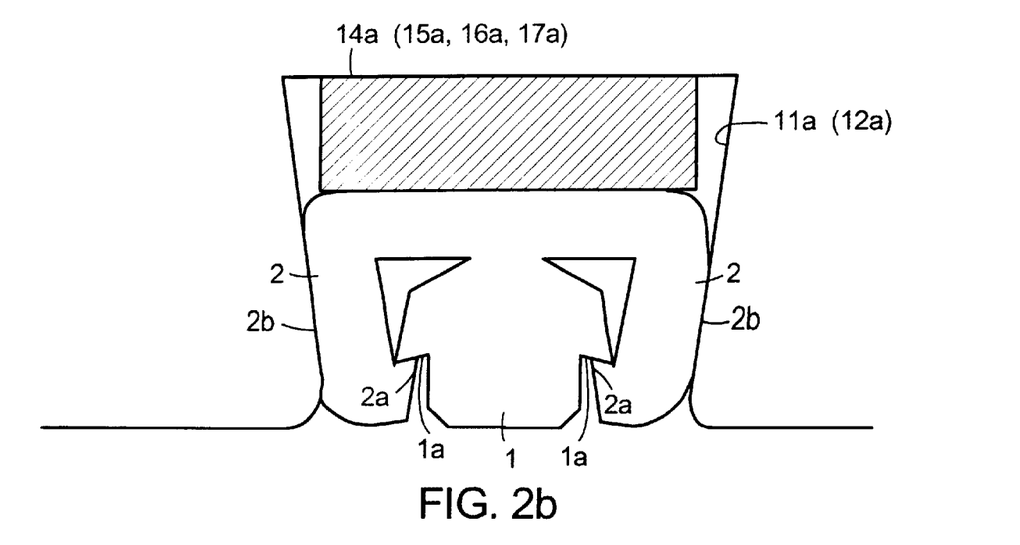
Figure 5:
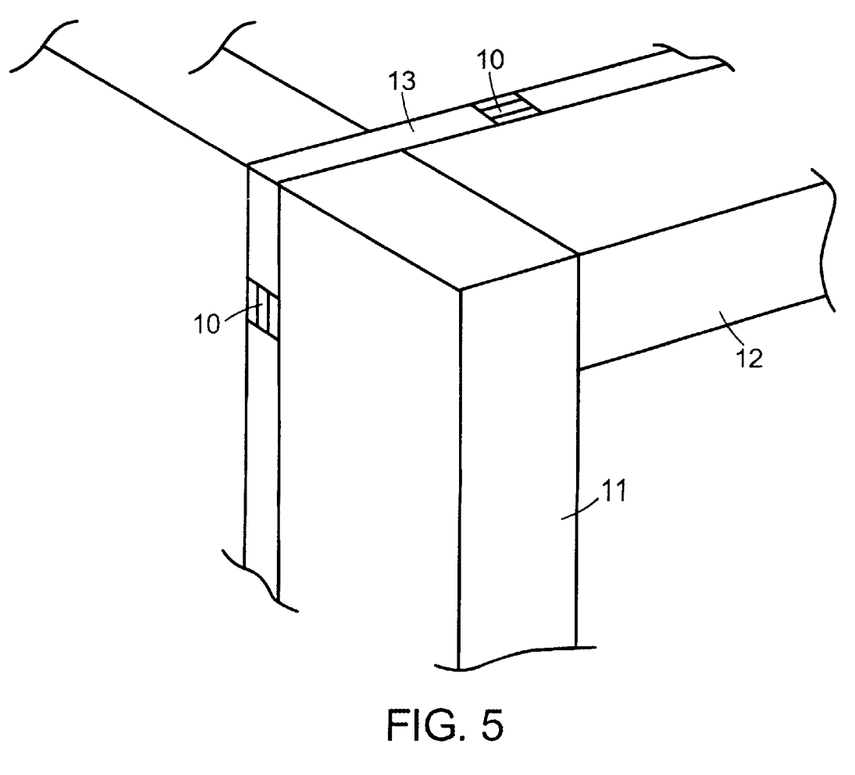
FIG. 5 is a perspective view showing a plurality of members joined using the fastener and fastening structure of the invention.
Figure 8:
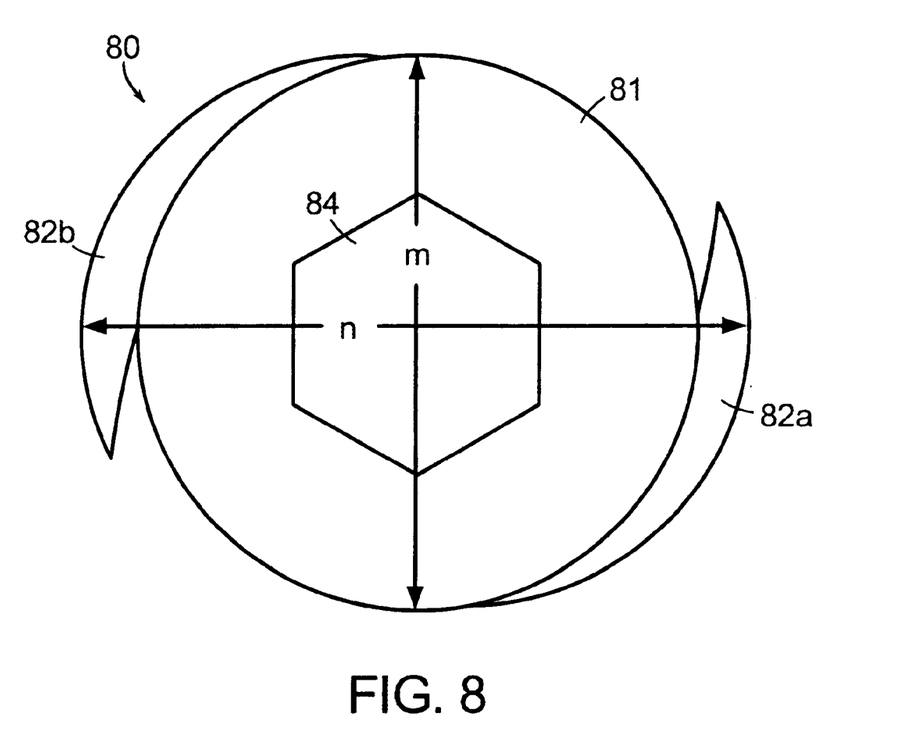
FIG. 8 is a plan view of another fastener according to the invention.
Figure 9:
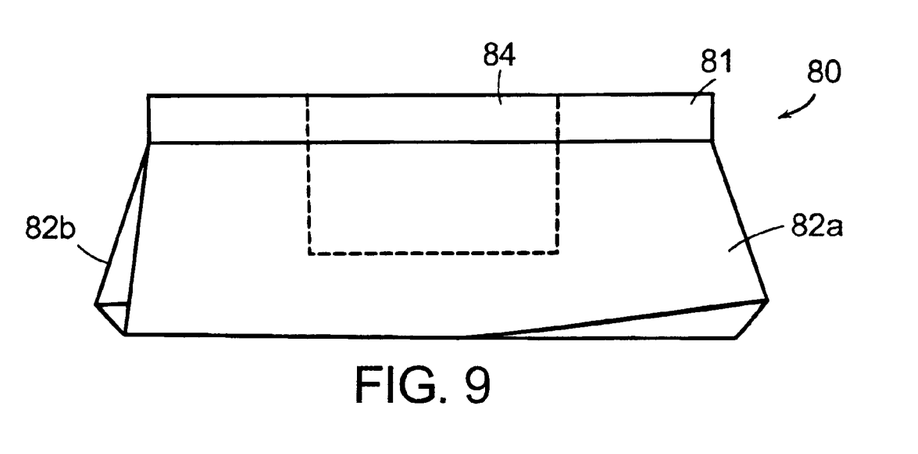
FIG. 9 is a side view of the fastener shown in FIG. 8.

Embodiments of the invention will now be explained with reference to the drawings. FIGS. 1(a) and 1(b) show a fastener 10 according to a first embodiment of the invention, FIGS. 2(a) and 2(b) show how the fastener 10 is used, FIG. 3 is an exploded perspective view showing an example of joining a plurality of members (panels), FIGS. 4(a) to 4(d) are sectional views of the legs of a connector shown in FIG. 3, FIG. 5 is a perspective view showing joined members, FIGS. 6 and 7(a) to 7(c) are an exploded view and side views relating to an aspect of the invention utilizing mortises of rectangular section, and FIGS. 8 and 9 are a plan view and a side view of a fastener according to another aspect of the invention.

FIG. 1(a) is a front view of the fastener 10 and FIG. 1(b) is a plan view thereof. The fastener 10 comprises an operating piece 1 and elastic members 2, 2 extending symmetrically from one end of the operating piece 1. The operating piece 1 is formed with step-like catches 1a, 1a on opposite sides of its base portion. The elastic members 2, 2 are formed at their distal ends with hook-like projections constituting claws 2a, 2a. The fastener 10 of this structure can be formed, for example, by injection molding of a plastic.

Figure 3:
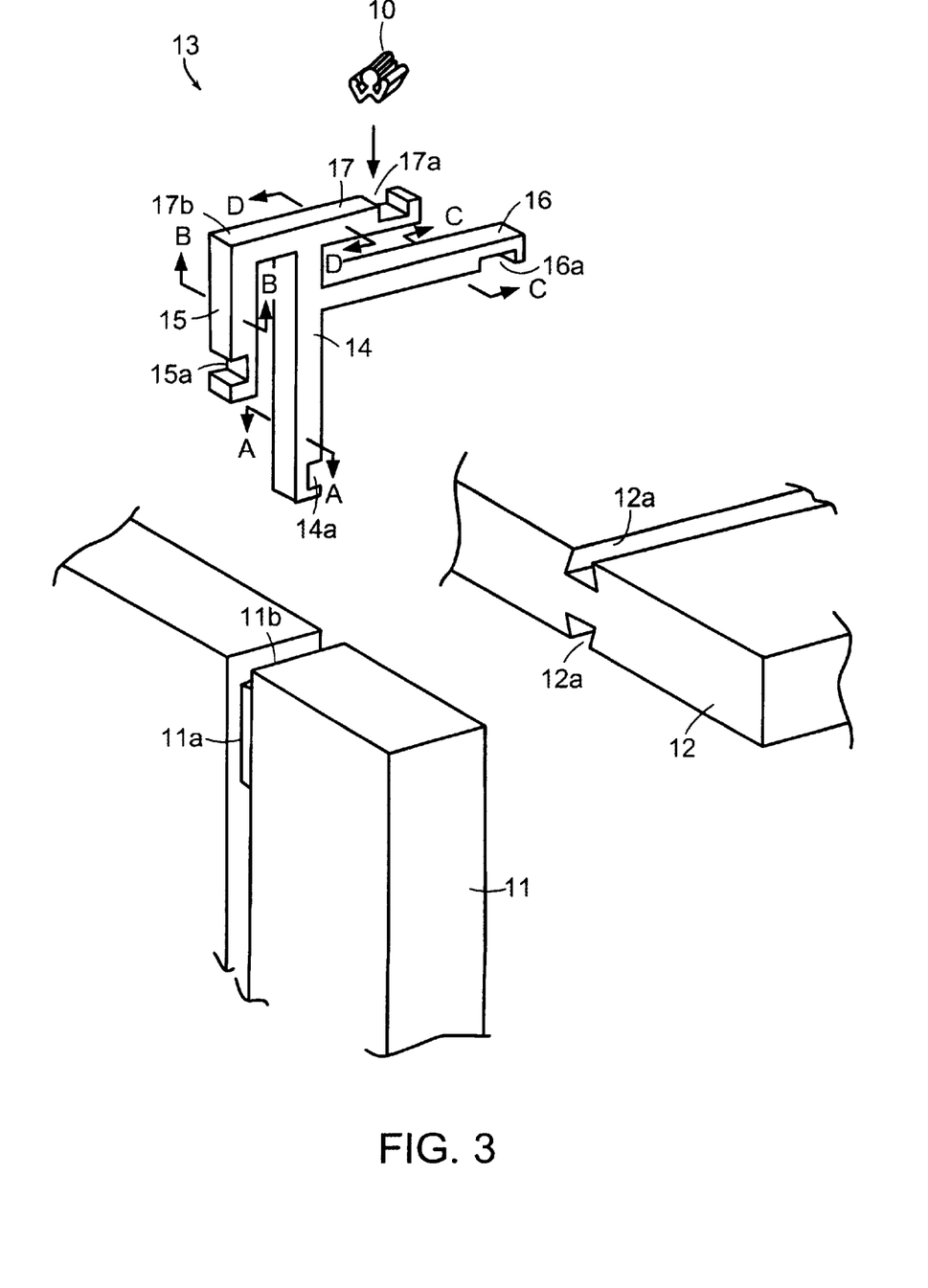
FIG. 3 is an exploded perspective view of a structure for joining a plurality of members according to the invention.
Figure 4A:
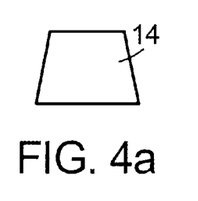
FIGS. 4(a) to 4(d) are diagrams showing sections of the legs of a connector taken respectively along lines A—A, B—B, C—C and D—D in FIG. 3.
Figure 4B:
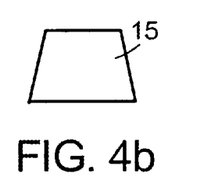
Figure 4C:
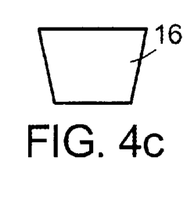
Figure 4D:
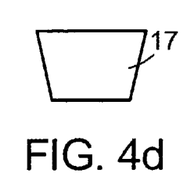

FIG. 3 shows an example of using the fastener 10 to join a first member 11 and a second member 12, which are both wood panels. The vertically oriented first member 11 is formed with a longitudinal dovetail mortise 11a (a mortise broadening inward from a narrow entrance). Although the dovetail mortise is formed longitudinally over the full length of the first member 11 in this example, the invention is not limited to this configuration and dovetail mortises of other lengths are also possible. While the drawing shows only a single longitudinal dovetail mortise 11a, a similar longitudinal dovetail mortise is also formed in the rear surface of the first member 11 and the two dovetail mortises are interconnected by a groove 11b extending in the thickness direction of the first member 11.

The front are rear surfaces of the horizontally oriented second member 12 are similarly formed with longitudinal dovetail mortises 12a, 12a but not with a groove corresponding to the groove 11b.

FIG. 3 also shows a connector 13. The connector 13 has a pair of legs 14, 15 extending vertically (as seen in FIG. 3) and a pair of legs 16, 17 extending horizontally to make right angles with the legs 14, 15. As shown in FIGS. 4(a)–4(d), these legs all have the same trapezoidal sectional shape and are configured to fit snugly into the dovetail mortises 11a, 11a and 12a, 12a. The legs 14 to 17 are formed near their tips with rectangular notches 14a, 15a, 16a and 17a for insertion of fasteners 10.

The method of assembly will now be explained. First, the leg 14 and the leg 15 of the connector 13 are successively inserted from their tips into the dovetail mortise on the rear side of the first member (panel) 11 and the dovetail mortise 11 a on the front side thereof. The insertion is continued until the stem 17b of the leg 17 fits into the groove 11b. Next, second member 12 (panel) is moved horizontally toward the connector 13 so that the leg 16 first enters the dovetail mortise 12a on the underside of the second member 12 and the leg 17 then enters the dovetail mortise 12a on the topside thereof The insertion is continued until the end surface of the second panel 12 abuts perpendicularly on the rear surface of the first panel 11. Finally, a fastener 10 is forced into each of the notches 14a, 15a, 16a, 17a now residing in one of the dovetail mortises.

Just after insertion into the dovetail mortises, the fasteners 10 are in the condition shown in FIG. 2(a). The operating piece 1 of each fastener 10 in this condition is pressed toward the floor of the associated dovetail mortise. As a result, the fastener 10 is put in the condition shown in FIG. 2(b). Specifically, the claws 2a, 2a of the elastic members 2, 2 engage with the step-like catches 1a, 1a of the operating piece 1, thereby preventing the operating piece 1 from resuming its original position. In addition, the outer locking surfaces 2b, 2b of the elastic members 2, 2 come to taper toward the base of the operating piece 1 and lie in strong surface to-surface pressure contact with inner walls of the associated dovetail mortise. Since the legs 14, 15, 16, 17 are therefore prevented from separating from the first and second panels 11 and 12, the panels 11 and 12 are fastened firmly together. This fastened state is shown in FIG. 5. Preferably, the surface of the connector 13 is made to become flush with the surfaces of the first and second panels 11 and 12. When they are, the fasteners 10 can also be prevented from protruding. The structure can therefore be completed with a markedly cleaner appearance than possible heretofore.

Although not illustrated, the invention can also be embodied in another configuration as a fastening structure that does not require the insert-and-engage type fastener 10 of the first embodiment. Like the first embodiment, the fastening structure for joining a plurality of members according to this embodiment requires the formation of mortises in the first and second members but does not require the mortises to be dovetailed (to broaden inward). In this embodiment, the connector is engaged to straddle the first and second members by sliding it into snug engagement with the mortises, whereafter the connector is fastened to the walls of the mortises by screws or other conventional fasteners instead of by the fastener 10 of the first embodiment. Since, unlike the first embodiment, this fastening structure does not use fasteners that engage by deformation upon forced insertion, it has the disadvantage of being difficult to reuse. On the other hand, it has the advantages of not requiring the connector to be formed with notches for receiving fasteners and can be realized with a smaller number of components since the fastener of the first embodiment is not necessary. Moreover, the fastening structure for joining a plurality of members according this embodiment of the invention can be realized without use of a fastener of special configuration as required by the first embodiment.

Figure 6:
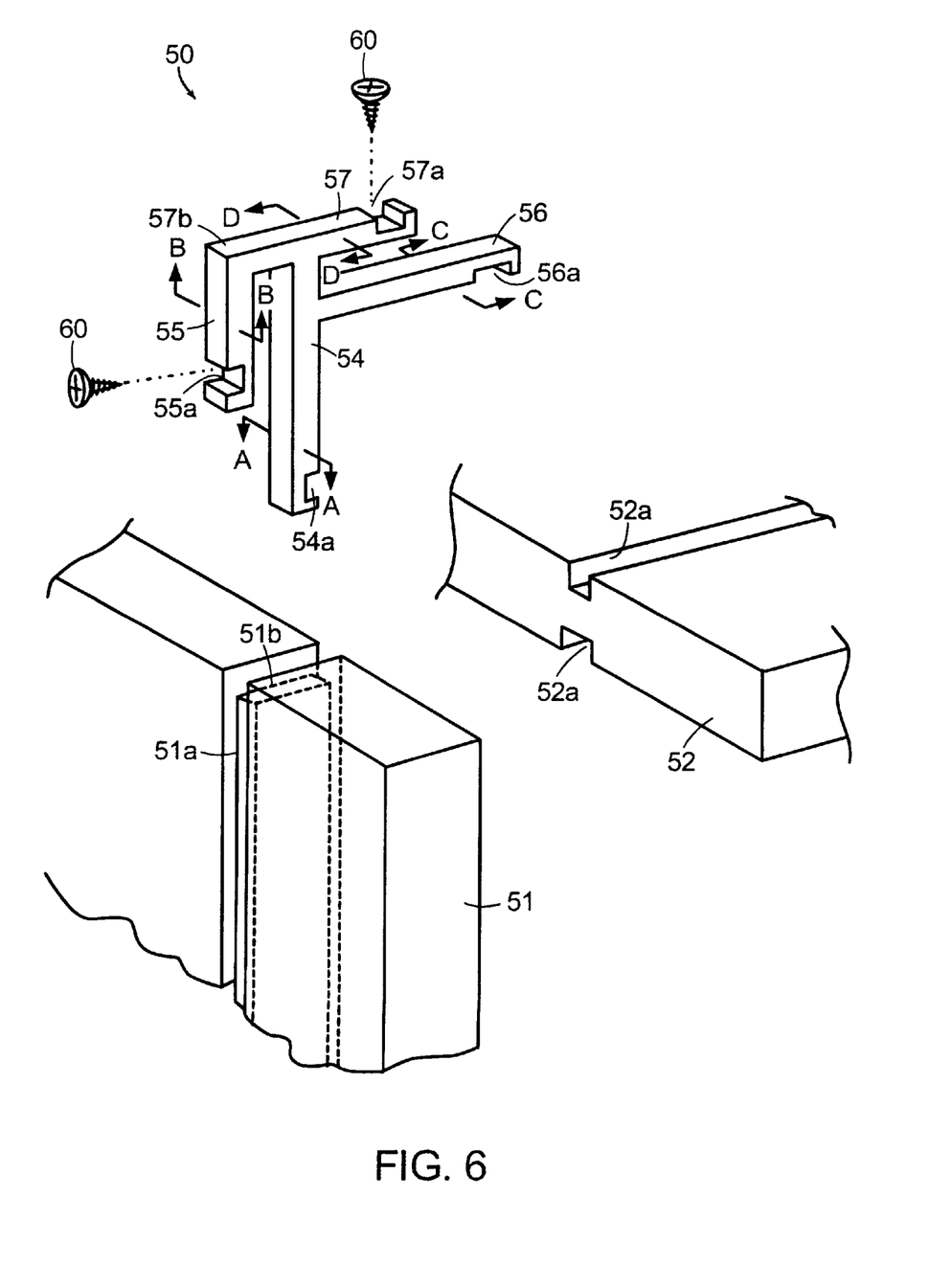
FIG. 6 is an exploded perspective view of a structure for joining a plurality of members according to another aspect of the invention.

A third embodiment of the invention is shown in FIG. 6. The illustrated example relates to fastening a first member 51 and a second member 52, both made of wood, at right angles. The vertically oriented first member 51 is formed with a mortise 51a of rectangular section. Specifically, unlike in the first embodiment, the mortises in this third embodiment is not required to be dovetailed. Although the fastener according to the first embodiment requires adoption of dovetailed mortises, this is not a requirement when other types of fasteners, e.g., screws 60 or the like, are used. In the case of applying this invention to ordinary buildings, partitions, furniture, scaffolding, guardrails, structures used in civil engineering and the like, the elimination of the need for dovetail mortising is a considerable advantage from the point of work simplification.

The sectionally rectangular mortise 51a is cut over the full length of the first member (panel) 51. The mortise is, however, not limited to the exemplified length. While the drawing shows only the mortise 51a in the front surface of the panel, a similar mortise is also formed in the rear surface of the first panel 51 and the two mortises are interconnected by a groove 51b extending in the thickness direction of the first panel 51.

The front and rear surfaces of the horizontally oriented second member (panel) 52 are similarly formed with mortises 52a, 52a but not with a groove corresponding to the groove 51b.

FIG. 6 also shows a connector 50 according to this embodiment.

The connector 50 has a pair of legs 54, 55 extending vertically (as seen in FIG. 6) and a pair of legs 56, 57 extending horizontally. Unlike in the first embodiment, these legs are all rectangular in sectional shape. The legs are formed with notches 54a, 55a, 56a and 57a for insertion of fasteners.

When the vertically oriented first panel 51 and the horizontally oriented second panel 52 are joined at right angles and a load is applied to the horizontal panel, a bending moment ordinarily acts on the whole horizontal panel in an obliquely downward direction. Since the bending moment centers mainly at the joint, support is required in proportion. In this embodiment, however, the load is dispersed, with tensile load acting on the leg 57 and compressive load acting on leg 56. Since the legs are made of, for example, sintered metal clad with aluminum or steel, their durability against tension and compression is naturally better than their durability against bending. The overall strength of the structure consisting of multiple (two in this example) members is therefore great even when no reinforcing panel is present.

Figure 7A:
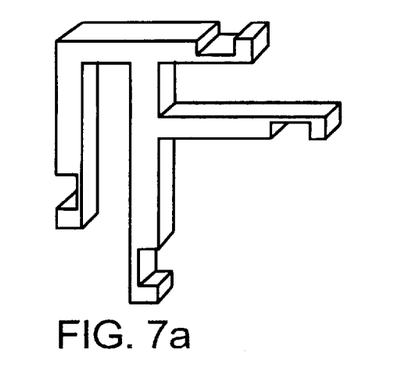
FIGS. 7(a) to 7(c) are diagrams showing different types of legs of other connectors having pairs of legs joined at right angles, FIG. 7(a) being a side view of a connector for joining two members at right angles, FIG. 7(b) being a side view of a connector for joining three panels in the manner of a T junction, and FIG. 7(c) being a side view of a connector for joining a panel at the corner of two panels connected at right angles.
Figure 7B:
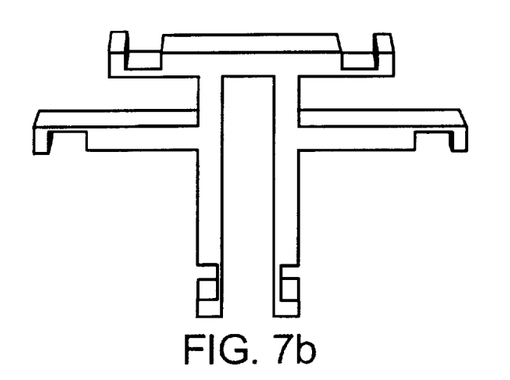
Figure 7C:
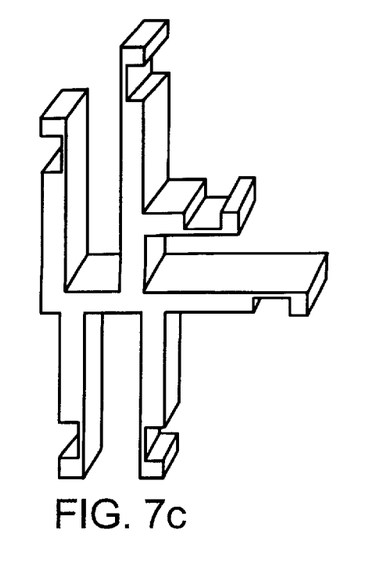

Further embodiments of the invention are shown in FIG. 7. Specifically, FIG. 7 illustrates different types of legs of connectors having pairs of legs joined at right angles. FIG. 7(a) is a side view of a connector for joining two members at right angles, FIG. 7(b) shows a connector for joining three panels in the manner of a T junction, and FIG. 7(c) is a side view of a connector for joining a panel at the corner of two panels connected at right angles.

FIG. 8 is a plan view of another embodiment of the fastener according to the invention and FIG. 9 is a side view thereof As shown in FIG. 6, the fastening structure with which the fastener 80 of this embodiment is used includes the mortises 51a and 52a of rectangular sectional shape formed in the surfaces of the plurality of panels (the first and second members 51 and 52) and the connector 50 having the pairs of legs 54, 55 and 56, 57 formed in the same sectional shape as the mortises and connected at right angles. The legs of the connector 50 are slid into the mortises of the panels and engaged therein by the fastener 80. The legs of the connector 50 are formed with the notches 54a, 55a, 56a and 57a which face outward after insertion of the legs into the mortises. Since the legs have the same sectional shape as the mortises, the widths of the notches are substantially equal to the widths of the mortises. Their lengths (in the longitudinal direction of the mortises) are, however, made greater than their widths. The fasteners 80, which, as explained below, are cylindrical bodies whose sectional shape is not a true circle, can therefore be inserted into the notches.

Each fastener 80 is composed of a cylindrical body 81, two projections 82a, 82b protruding spirally from the peripheral surface of the cylindrical body 81, and a hole 84 in the upper surface of the cylindrical body 81. The diameter m of the cylindrical body 81 of the fastener is substantially equal to the width of the mortises 51a, 52a formed in the opposite surfaces of the panels to have rectangular sectional shapes. This diameter (width) is approximately the same as the width of the notches formed in the legs of the connector 50. While FIGS. 8 and 9 show an example in which the cylindrical body 81 is provided with two projections 82a, 82b at diametrically opposite locations, it is alternatively possible to provide only one projection at any desired location. In the illustrated embodiment, the projections 82a, 82b protrude from the peripheral surface of the cylindrical body 81 at diametrically opposite locations and are formed in spiral shapes that integrally slope stepwise into the peripheral surface. The diameter n of the portion provided with the projections 82a, 82b is made larger than the diameter m of the cylindrical body 81.

Since the diameter n of the portion provided with the projections is too large to fit into the mortises 51a, 52a and the notches 54a, 55a, 56a and 57a, the insertion of the fastener 80 is made by rotating it 90 degrees so that it can be fitted in the longitudinal direction of the notch with its diameter m aligned with the notch width.

The hole 84 is a groove cut in the upper surface of the fastener 80 for enabling rotation of the fastener 80 by inserting a screwdriver into the hole 84. The hole 84 is formed to a shape matched to the tip of the screwdriver, which can be of slot, Phillips, box (socket) or any other desired type. The illustrated hole 84 of this embodiment is shaped to receive a box (socket) type screwdriver tip.

Alternatively, the hole 84 can be formed receive either a slot or Phillips screwdriver tip.

When the panels 51 and 52 are joined, they are first joined by the connector 50 as shown in the exploded perspective view of FIG. 6. In this joined state, the outward facing notches 54a, 55a, 56a and 57a provided in the legs of the connector 50 are present as rectangular openings in the front and rear surfaces of the first and second panels 51 and 52. A fastener 80 is inserted longitudinally into each of these 54a, 55a, 56a and 57a with its narrower width m aligned with the width the notch.

After the pairs of sectionally rectangular legs of the connector 50 have been inserted into the mortises of the first and second panels 51 and 52, a fastener 80 is inserted longitudinally into each notch of the legs with its width m aligned with the width of the notch and with the hole 84 facing outward. Next, each inserted fastener 80 is rotated 90 degrees using the tip of a screwdriver inserted into the hole 84 formed in the upper surface of the fastener. As a result, the cylindrical body 81 is rotated 90 degrees to cause the portion of the cylindrical body 81 formed on its side surfaces with the projections and having the width n to make strong contact with the walls of the mortises 51a, 52a. Since the fastener 80 is formed with the step-like spiral projections in the clockwise direction in which the rotation by the screwdriver is effected, the rotation of the fastener 80 with the screwdriver causes it to advance spirally toward the floor of the notch to be forced deeper into the notch with progressive rotation. The large-diameter portions with the projections therefore press strongly against the opposite inner walls of the notch to join the first and second panels solidly via the connector.

Each fastener 80 is maintained in forced contact with the inner walls of the associated notch. Since the legs 54, 55, 56, 57 are therefore prevented from separating from the first and second panels 51 and 52, the panels 51 and 52 are fastened together. Preferably, the surface of the connector 50 is made flush with the surfaces of the first and second panels 51 and 52. When they are, the fasteners 80 can also be prevented from protruding. The structure can therefore be completed with a markedly cleaner appearance than possible heretofore.

Being configured as explained in the foregoing, the fastener and the fastening structure for joining a plurality of members according to the invention provide the following effects when used in the fabrication of furniture, partitions, scaffolding, guardrails, civil engineering structures etc. 1—1 Since pairs of panels or boards can be strongly joined by fasteners that do not protrude from the panel surfaces, the resulting structure can be given a finish as though the joining were effected without use of fasteners.

1–2 In one aspect of the invention, the fastener has an operating piece provided with catches and elastic members provided at their tips with claws engageable with the catches of the operating piece, and the configuration is such that the outer locking surfaces of the elastic members taper toward the base of the operating piece when the claws of the elastic members engage with the catches of the operating piece. The engagement between the catches and the claws can therefore be achieved by a simple one-touch operation of pressing the operating piece inward after the fastener has been inserted into the dovetail mortise. By this, the two panels can be firmly joined and immobilized owing to the strong surface-to-surface pressure between outer locking surfaces and the side walls of the dovetail mortise.

1–3 Since the structure is simple and the connector can be inserted by a simple sliding action, the fastener can be detached and reused to again achieve a solid joint exhibiting no looseness.

2 Since the catches are formed as steps and the claws as hook-like projections, reliable engagement can be achieved by a simple and easy press-in operation.

3 The connector is inserted into the dovetail mortises cut into the first and second members, whereafter coupling and immobilization are achieved by a one-touch operation of the fasteners. Since the connector therefore does not project from the surface of the joined members, a structure (e.g., a piece of furniture) fabricated according to the invention can be placed flush against another or against a wall without leaving an intervening space.

4 In another aspect of the invention, since the connector is inserted into the mortises cut into the first and second members, whereafter coupling and immobilization are achieved by one-touch fasteners, screws or the like, a fastener of complicated structure is unnecessary.

5 In another aspect of the invention, the need to form dovetail mortises is eliminated. Since mortises with rectangular sections suffice, they can be conveniently and easily formed in conventional panel and board materials. This aspect of the invention can also be applied widely to the assembly of architectural modules, knock-down housing, knock-down furniture and the like.

6 Members can be readily joined using conventional screws and the like.

7 In another aspect of the invention, the connector is inserted into mortises formed in the first and second members and solid immobilization is achieved by rotating a fasteners of simple structure to force them into contact with the inner walls of the mortises. This eliminates any need for fasteners such as screws and nuts and advantageously enables provision of assembled structures that are made of a plurality of generally available materials and have no fasteners projecting from the wall surfaces thereof 8 Since the fastener is configured to have spiral projections formed integrally on the outer peripheral surface of a cylindrical body, it can be used to firmly join multiple panel members via a fastening structure by the extremely simple operation of using a screwdriver to rotate the fastener 90 degrees and bring it into strong pressure contact with the inner walls of a mortise.

9 Although conventional fasteners require complex operations, the fastener according to this aspect of the invention enables very strong connection by a simple operation of rotating the fastener 90 degrees with the tip of a screwdriver inserted into a hole provided for this purpose in the fastener.

What is claimed is:

1. A structure for joining at least two members comprising
   at least two members to be joined, each having mortises of rectangular section formed in front and rear surfaces thereof,
   a connection for joining the at least two members composed of pairs of parallel legs, said parallel legs being joined at right angles to an element joining said parallel legs to one another, the legs having rectangular sectional shapes at all points along their lengths like those of the mortises and being formed with outwardly-facing notches, and
   fasteners for insertion into the notches,
   so that, when assembled the legs are in the mortises and the fasteners are in the notches and contact portions of the members adjacent the mortises.

2. A structure for joining at least two members comprising
   at least two members to be joined, each having mortises of rectangular section formed in front and rear surfaces thereof
   a connector for joining the at least two members composed of pairs of parallel legs, said parallel legs being joined at right angles to an element joining said parallel legs to one another, the legs having rectangular sectional shapes at all points along their lengths like those of the mortises and being formed with outwardly-facing notches, and screws
so that, when assembled, the legs are in the mortises and are held by the screws.

* * * * *